United States Patent
Hellier et al.

(10) Patent No.: US 10,674,057 B2
(45) Date of Patent: Jun. 2, 2020

(54) AUDIO EVENT DETECTION FOR AUTOMATIC PLENOPTIC VIDEO REFOCUSING

(71) Applicant: INTERDIGITAL CE PATENT HOLDINGS, Paris (FR)

(72) Inventors: Pierre Hellier, Thorigne Fouillard (FR); Quang Khanh Ngoc Duong, Rennes (FR); Valerie Allie, Saint Armel (FR); Philippe Leyendecker, Chateaugiron (FR)

(73) Assignee: INTERDIGITAL CE PATENT HOLDINGS, Paris (FR)

(*) Notice: Subject to any disclaimer, the term of this patent is extended or adjusted under 35 U.S.C. 154(b) by 0 days.

(21) Appl. No.: 15/278,664

(22) Filed: Sep. 28, 2016

(65) Prior Publication Data

US 2017/0094143 A1  Mar. 30, 2017

(30) Foreign Application Priority Data

Sep. 29, 2015  (EP) .................................... 15306529

(51) Int. Cl.
*H04N 5/232* (2006.01)
*H04R 1/40* (2006.01)
(Continued)

(52) U.S. Cl.
CPC ......... *H04N 5/232* (2013.01); *H04N 5/23212* (2013.01); *H04R 1/406* (2013.01);
(Continued)

(58) Field of Classification Search
CPC ........ H04N 7/188; H04N 7/181; H04N 5/232; H04N 5/23212; H04N 5/23296; G06K 9/00778; G06Q 30/0252; G06Q 30/0267; H04R 1/406; H04R 29/00; H04R 2227/003; H04R 3/005; H04R 27/00;
(Continued)

(56) References Cited

U.S. PATENT DOCUMENTS 6,469,732 B1  10/2002  Chang et al.
8,803,988 B2  8/2014  Lee et al.
(Continued)

FOREIGN PATENT DOCUMENTS

CN  203366132 U  12/2013
JP  2000101901 A  4/2000

OTHER PUBLICATIONS

Chakraborty et al.: Sound-Model-Based Acoustic Source Localization Using Distributed Microphone Arrays. IEEE International Conference on CASSP, 2014, pp. 619-623.
(Continued)

*Primary Examiner* — Pritham D Prabhakher
(74) *Attorney, Agent, or Firm* — Lily Neff

(57) ABSTRACT

A plenoptic camera and associated method is provided. The camera has an array of sensors for generating digital images. The images have associated audio signals. The array of sensors are configured to capture digital images associated with a default spatial coordinate and are also configured to receive control input from a processor to change focus from said default spatial coordinate to a new spatial coordinate based on occurrence of an event at said new spatial coordinate.

20 Claims, 4 Drawing Sheets

(51) Int. Cl.
  *H04R 29/00* (2006.01)
  *H04R 27/00* (2006.01)
  *H04R 3/00* (2006.01)

(52) U.S. Cl.
  CPC .............. *H04R 29/00* (2013.01); *H04R 3/005* (2013.01); *H04R 27/00* (2013.01); *H04R 2227/003* (2013.01); *H04R 2499/11* (2013.01); *H04S 2400/15* (2013.01)

(58) Field of Classification Search
  CPC . H04R 2499/11; H04S 2400/15; G06T 17/20; G06T 5/50; G06T 5/003; G06T 2207/10148; G06T 2207/10052; G06T 2200/21
  USPC .......................................................... 348/345
  See application file for complete search history.

(56) References Cited

U.S. PATENT DOCUMENTS

| | | | |
|---|---|---|---|
| 9,025,835 B2* | 5/2015 | Ptucha | G06T 11/60 382/118 |
| 9,451,148 B2* | 9/2016 | Sugawara | H04N 5/23212 |
| 9,489,564 B2* | 11/2016 | Gattuso | H04N 5/23219 |
| 9,503,786 B2* | 11/2016 | el Kaliouby | A61B 5/165 |
| 9,591,418 B2* | 3/2017 | Shenoy | H04S 7/302 |
| 9,942,511 B2* | 4/2018 | Jung | H04N 1/00137 |
| 10,044,985 B1* | 8/2018 | Parker | H04N 5/22541 |
| 2003/0160862 A1 | 8/2003 | Charlier et al. | |
| 2005/0015286 A1 | 1/2005 | Rudnik et al. | |
| 2010/0166406 A1 | 7/2010 | Fan | |
| 2011/0051953 A1* | 3/2011 | Makinen | H04R 1/406 381/92 |
| 2011/0273466 A1 | 11/2011 | Imai et al. | |
| 2013/0169853 A1 | 7/2013 | Luong | |
| 2013/0329068 A1* | 12/2013 | Hamanaka | H04N 5/23293 348/218.1 |
| 2014/0086551 A1 | 3/2014 | Kaneko | |
| 2014/0104392 A1 | 4/2014 | Thorn et al. | |
| 2014/0254808 A1 | 9/2014 | Park et al. | |
| 2015/0016693 A1* | 1/2015 | Gattuso | H04N 5/23219 382/118 |
| 2015/0078556 A1 | 3/2015 | Shenoy et al. | |
| 2015/0350730 A1* | 12/2015 | el Kaliouby | A61B 5/165 725/12 |
| 2016/0188635 A1* | 6/2016 | Shah | G06T 3/40 348/207.1 |
| 2016/0205358 A1* | 7/2016 | Dickinson | H04N 7/181 348/157 |

OTHER PUBLICATIONS

Hegedus et al.: Sensor Fusion Method for Passive Acoustic Arrays. IEEE 2009, pp. 750-755.
Nakadai et al.: Footstep Detection and Classification Using Distributed Microphones. 2013 14th International Workshop on Image Analysis for Multimedia Interactive Services (WIAMIS), 4 pages.
Xu et al., "Affective Content Analysis in Comedy and Horror Videos by AudioEmotional Event Detection,". In Multimedia and Expo, 2005. ICME 2005. IEEE International Conference on (pp. 4-pp). IEEE.
Ng et al., "Light Field Photography with a Hand-held Plenoptic Camera", Stanford University Computer Science Technical Report, CSTR 2005-02, Apr. 2005, pp. 1-11.
B. Reuderink et al., "Decision-Level Fusion for Audio-Visual Laughter Detection." In Machine Learning for Multimodal Interaction (pp. 137-148). 2008 Springer Berlin Heidelberg.
R. Cai et al., "Highlight Sound Effects Detection in Audio Stream." In Multimedia and Expo, 2003. ICME'03. Proceedings. 2003 International Conference on (vol. 3, pp. III-37). IEEE.
M. Crocco et al., "A Bilinear Approach to the Position Self-Calibrationof Multiple Sensors," IEEE Transactions on Signal Processing, vol. 60, No. 2, pp. 660-673, Feb. 2012.
N. Gaubitch et al., "Auto-Localization in Ad-Hoc Microphone Arrays," Proc. ICASSP, pp. 106-110, 2013.
C. Clavel et al., "Events detection for an audio-based surveillance system." in Multimedia and Expo, 2005. ICME 2005. IEEE International Conference on (pp. 1306-1309). IEEE.

* cited by examiner

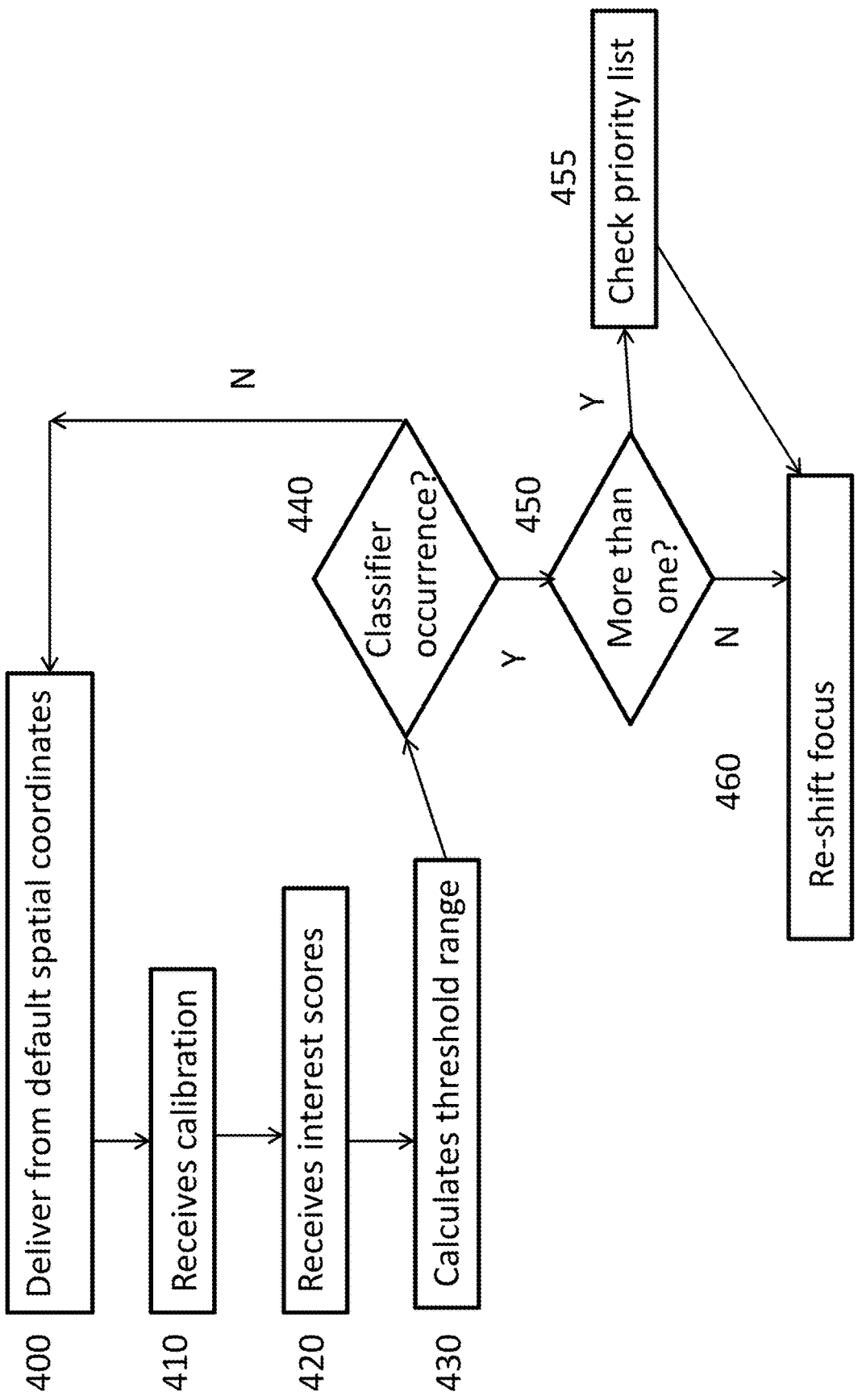

AUDIO EVENT DETECTION FOR AUTOMATIC PLENOPTIC VIDEO REFOCUSING

FIELD OF INVENTION

This application claims the benefit under 35 U.S.C. § 119 of European Patent Application No. EP15306529.7, filed Sep. 29, 2015.

TECHNICAL FIELD

The present disclosure relates generally to recording and broadcasting technology and more particularly to broadcasting using a plenoptic camera with a refocusing feature.

BACKGROUND

This section is intended to introduce the reader to various aspects of art and to facilitate a better understanding of the various embodiments presented. Accordingly, it should be understood that these statements are to be read in this light, and not as admissions of prior art.

A typical 3D image capturing device with a simple arrangement captures both a right-eye image and a left-eye image. Accordingly, such a method requires two cameras to increase the overall size and quality of the final product. To overcome the burden of using two cameras simultaneously, techniques for capturing multiple images with parallax or "multi-viewpoint image" capacity have been developed that use a single plenoptic camera. A plenoptic camera captures images by using a single lens that is disposed in front of a lenticular lens array at the imaging plane. In the plenoptic camera, the main lens aperture is imaged behind each lenticular element. The final image is generated from the multiple sub-images captured by different lenses with each lens reflecting the scene in front of it.

The image behind the lenticular array is digitized to obtain a digital plenoptic image. As a result, each sub-image is represented by a localized array of pixels that encodes the path of light rays entering the main aperture. For a large aperture, various pixels of each sub-image will be lit in the sub-image. For a small aperture, only one pixel will be lit.

In recent years, in addition to the development of the plenoptic camera, the performance and functionality of digital cameras and digital movie cameras as a whole has been independently enhanced due to improvements in technology. For example, the use of some solid-state image sensors such as a charge couple device arrays (CCD) or a complementary metal oxide semiconductor array (CMOS) have been greatly enhanced the quality and ease of using these cameras. In particular, the size of a pixel structure for use in an image sensor has been further reduced due to rapid development of semiconductor device processing technologies, thereby achieving greater resolution. The development of plenoptic cameras combined with enhancements in imaging the technology now enables a greater numbers of pixels and drivers to be integrated together in an image sensor, thereby providing amazing results. Such developments can enhance viewing pleasure and improve resolution of presented images. However, prior art is still devoid of devices and technologies that take fully advantage of these improvements in creating an immersive viewing experience and hence improve the entertainment value as a whole.

SUMMARY

A plenoptic camera and associated method is provided. In one embodiment, the camera has an array of sensors for generating digital images. The images have associated audio signals. The array of sensors are configured to capture digital images associated with a default spatial coordinate and are also configured to receive control input from a processor to change focus from said default spatial coordinate to a new spatial coordinate based on occurrence of an event at said new spatial coordinate.

In another embodiment, the associated method comprises receiving via a processor a plurality of digital images from the plenoptic camera; receiving via the processor a plurality of audio signals associated with the images; and determining by the processor occurrence of an event and changing focus from the default spatial coordinate to a new spatial coordinate associated with the occurrence of the event.

BRIEF DESCRIPTION OF THE DRAWINGS

The invention will be better understood and illustrated by means of the following embodiment and execution examples, in no way limitative, with reference to the appended figures on which:

FIG. 4 is a flow chart diagram depicting delivery of images and associated audio signals as per one embodiment.

In FIGS. 1-3, the represented blocks are purely functional entities, which do not necessarily correspond to physically separate entities. Namely, they could be developed in the form of software, hardware, or be implemented in one or several integrated circuits, comprising one or more processors.

Wherever possible, the same reference numerals will be used throughout the figures to refer to the same or like parts.

DESCRIPTION

Figure 1:
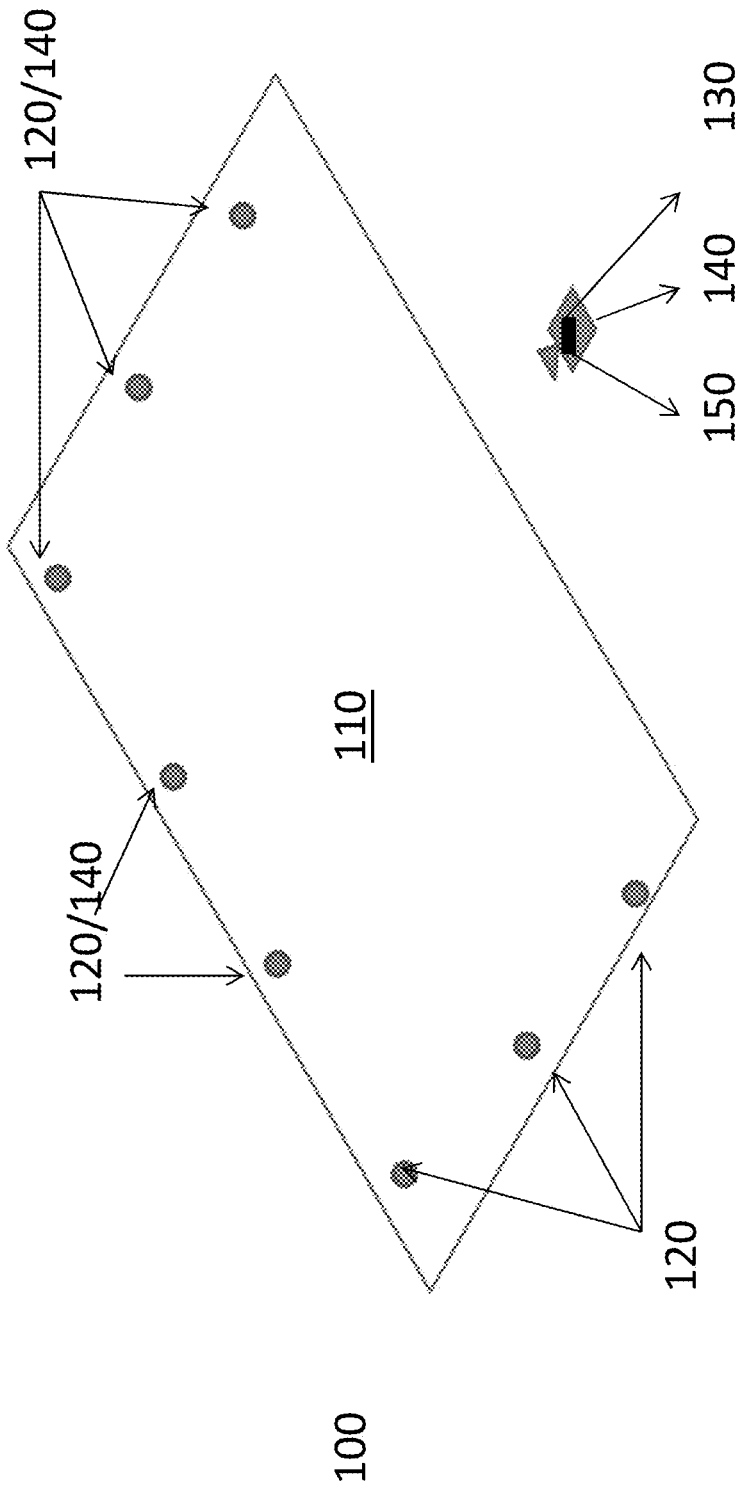
FIG. 1 depicts a block diagram showing a distributed plenoptic imaging system having a plurality of microphones.

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modification FIG. 1 is an illustration of one embodiment showing a plenoptic imaging system 100. A venue such as the sporting arena 110 can be provided that allows broadcasting of a game or a concert. In this embodiment, the broadcast is performed using one or more plenoptic cameras as shown at 130. A plurality of microphones 120 can also be selectively disposed in certain desired locations across the arena 110 as shown. In general, broadcasting usually involves the distribution of audio and/or video content to a dispersed audience via one or more, mostly electronic, communications medium. Broadcasting from a large venue such as the arena 110 had historically encompassed distribution via radio and television (TV) programming. However, in recent years, broadcasting can include streaming images over the Internet by individuals and other entities.

In many contexts, broadcasts are made for large audiences such as those provided on the Internet or for general mass consumption using radio and television systems. However, the present system as shown in FIG. 1, not only provide broadcasting for larger and more public audiences but can also be provided such that it is deemed appropriate for more limited viewing. The latter can include a variety of venues such as department stores, banks, apartment buildings, catering halls or even small venues that are centered around family or school events. In addition, the uses can vary ranging from enticing purchasing of products to enhancing security.

In one embodiment, the system 100 includes one or more computers and or processors 150 which allow overall management of the images and audio and provide for the broadcasting of the images and/or audio to one or more user devices. In FIG. 1, the processor 150 is part of the plenoptic camera 130 as shown but in other embodiments the processor may be a separate entity or be a part of one or more computers and/or servers. While FIG. 1 depicts a single venue system, in other embodiments there may be multiple venues, that may be located in remote facilities from one another, and each having at least one plenoptic camera. The broadcast between separate venues will be monitored and controlled by the processor(s) or computer(s) and can be managed similar to single venue systems.

Immersive broadcasting had been particularly challenging to provide when arenas are large or when events are dispersed across multiple facilities. An immersive video broadcast does not need to be always recorded in an arena to have a refocusing need. Any event that can be recorded or broadcasted with a plenoptic camera may be sufficiently expansive and have certain needs similar to that of a particularly large event. Examples of such events include both larger arenas that include concert halls, sporting venues, staged and theatrical venues such as opera houses, playhouses, movie theaters etc. or smaller venues such as conference and wedding halls, stores or multi facility venues that can include hotels, banks and apartment buildings that have security needs as discussed earlier.

In single facility venues, as shown in FIG. 1, the video and audio can be captured in selective special locations around a single facility or arena. In multi-facility venues (not shown) the same can still hold through, except that the spatially located cameras and audio devices are not dispersed in a single location but in multiple locations. In each case one or more computers and/or processors (150) can control the communication between the multiple devices. In one embodiment, the use of plenoptic camera (130) will allow the focus to be diverted from one part of the arena to another. The same can be done with several plenoptic cameras in multifacility environments. In such a case, there would be a default view and then multiple other views where the scenes captured simultaneously by the same plenoptic camera. There will be one or more preselected events that will shift the focus of the broadcasted event from the default scene to an alternate scene. In order to make understanding of this concept easier, an example can be provided with reference to the embodiment of FIG. 1.

The venue here can be a single facility venue such as a stadium and the event may be a soccer match that is captured by only one camera. The default view is that of the playing field and the concentration is on the soccer match itself. The preselected event has audio feedback from the microphones. For instance, in this example, the stadium or sport arena 110 is surrounded by N microphones 120 that are strategically placed throughout the venue, such as along its perimeter. In one embodiment, a sudden increase in sound, or a sudden increase in sound that is over a certain threshold or decibel, will re-shift the broadcast focus to that area such that scenes in a nearby and immediately surrounding of that particular microphone will be broadcasted. In other embodiments, the preselected event may not be necessarily connected to audio feedback or be sensitive to a particular audio feedback. For example, a sudden discussion or sound of laughing can trigger the refocusing even through the sound does not exceed the threshold decibel.

In one embodiment, the system 100 comprises the plenoptic camera 130 configured to capture digital images and the processor 150 which is in communication with the plenoptic camera 130. The processor 150 is also in communication with at least one microphone (120) for receiving an audio signal associated with at least one captured digital image. The processor 150 is configured to deliver at least one digital image and associated audio associated with a default spatial coordinate (not shown). The processor 150 changes focus and delivery of digital images and associated audio from the default spatial coordinate to a new spatial coordinate based on occurrence of a preselected classifier. The classifier is based on occurrence of an event associated with the new spatial coordinate. The system 100 can also comprise multiple microphones and sensors 140 (only shown disposed as way of example and can be located in any other place) that can detect motion, lights, moisture, temperature or other such data as can be appreciated by those skilled in the art. This can provide a number of immersive opportunities. In on embodiment, for example, a number of players can be tracked in space and be associated (carry etc.) with sensors measuring parameters that in one embodiment can be physical (sudation, heart rate etc.) and this information can be also used to fine the best plane of interest.

The classifier can be defined, in one embodiment, as a variety of preselected or priority events which as discussed can then refocus the broadcast and delivery of the images from the default spatial coordinate to a new spatial coordinate associated with the classifier. This classifier can be associated with an event detected by audio, sensors, images, lights or a variety of other similar qualified events. For example, broadcast refocusing may occur based on detection of laughs, claps, balls being kicked, or even the occurrence of an abnormality event such as a fight between players or a discussion between referees. When the classifier is an audio event, the plenoptic acquisition will be refocused accordingly, and the audio mixed so as to create an immersive experience associated with the classifier (e.g., a particular event of interest). A visual event may include for example the flight of Peter Pan above a stage, in a theatrical production such that the camera will be refocus from the stage to the flying actor above the audience section. Again, when there is associated audio, this will be delivered simultaneously. As discussed, sound and audio feedback, may only be one such preselected option but other triggering events may also be selected such as by an event organizer.

In another embodiment, one or more plenoptic camera(s) may be used for security in one or more facility. Along with sound, there may be motion and light and/or heat detectors that can detect an unauthorized trespass. When several classifiers occur simultaneously, or several facilities are selected, in one embodiment, a priority list of classifiers or plenoptic cameras (as per facility) can be provided ahead of time to the processor and stored in a location or as will be discussed, such priority may be determined by the processor itself.

To discuss the embodiment where the processor can determine the order of importance, one example will now be used to ease understanding. However, as can be appreciated, different alternate embodiments can be provided as appreciated by those skilled in the art. In this example, audio is an important aspect of refocusing and delivery of the events (classifier). In this embodiment, the system 100 of FIG. 1 can be spatially calibrated. In such an embodiment, the position "$X_i$" of microphone "i" will become known in the coordinate system 100 of the plenoptic camera 130 by the processor 150. Such a system 100 gives the opportunity to have an immersive experience where the video can be refocused using any arbitrary plane. In addition, the audio can be mixed (or selected from one microphone near the position of the event of interest) so as to match the chosen viewpoint to which the broadcast will be refocused. In prior art, most refocusing has to be performed by hand. For instance, in a soccer game such as during the soccer world cup, the audio feedback is mixed from several microphones so that the "foreground" sound (e.g., ball being kicked) is provided at a higher decibel level than the background sound (the crowd talking). Automation of such process can provide many benefits including timely capture of events that may only last a few seconds, especially in a live broadcast where even a few seconds delay can cause the event not to be broadcasted.

In one embodiment, the equipment such as shown in FIG. 1 can be calibrated prior to the event. The calibration process is conducted as a pre-processing step before the commencement of the broadcast. In this embodiment, calibration is performed relationally and spatially. In this embodiment, the calibration requires placement of the at least one plenoptic camera 130 and the microphones 120 and determining the spatial position of the microphones in a coordinate system that includes the camera 130. After that calibration step, in one embodiment, a set of positions $\{X_i, \in [1,N]\}$ is computed via the camera associated processor (140) or by alternate computers or processors. In this embodiment, the signals from different microphones 120 may also be synchronized by known synchronization techniques such as those known by the skilled in the art and manipulated and managed further by the processor 140.

In another embodiment, an acquisition setup can be provided when the plenoptic camera 130 shoots, records or broadcasts the scene, and the distributed microphones acquire the audio. During the shooting, for example, and for each microphone, a detection of interesting feature is also performed which can be connected to preselection criteria. For instance, using a classifier, the detection of a particular sound like laughs, claps, ball kicked, can be done in real time using known techniques. In addition, it is also possible to use a detection of abnormalities on the audio signals, such as described previously. At the end of that process, each microphone, indexed by "i", is given an interest score between 0 and 1. A score of 0 indicates that there is no particular interest in that signal, while 1 indicates a maximal interest. Mathematically, the set of scores $\{S\_i(t), i \in [1,N]\}$ at instant t is estimated. The embodiment provided in FIG. 2 provides an example of such a detection.

Figure 2:
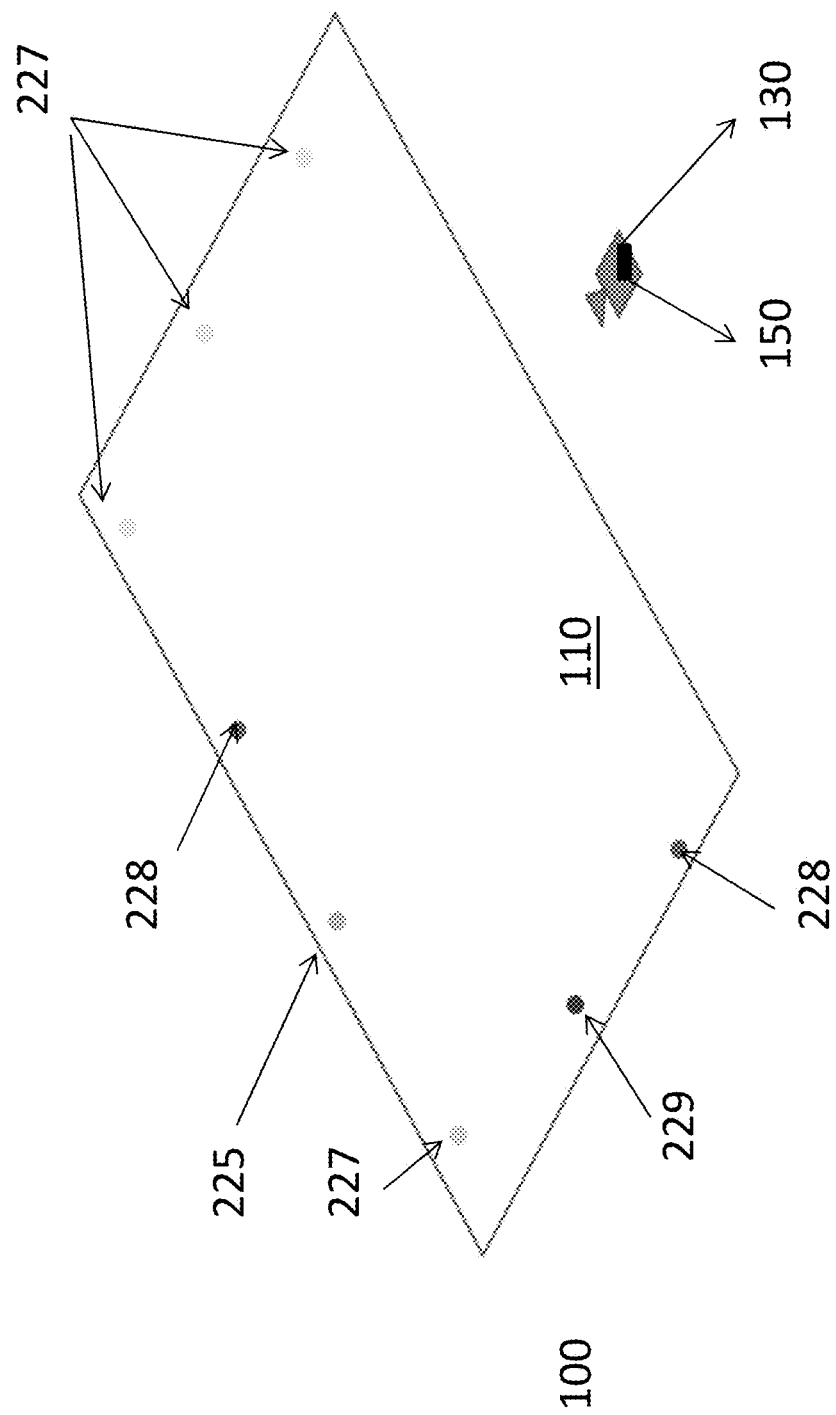
FIG. 2 depicts another block diagram as per the embodiment of FIG. 1, illustrating different computed interest scores as per one embodiment.

In the example depicted in FIG. 2, the shade of each microphone indicates the computed interest score. In this example the light gray is indicative of a low score, as shown by microphone 225, while dark gray (229) corresponds to a high score. The difference between the light and dark colors indicates a range of varying interest and score as shown in FIGS. 2 at 227 and 228. In this example, at each instant t, the optimal position of a refocusing plane can be computed, in one embodiment, as the solution of a weighted regression problem: estimate the plane position P(t) such as it minimizes the mean square error:

$$\hat{P}(t) = \underset{P}{\operatorname{argmin}}(\Sigma_{i=1}^{N} S_i(t) \cdot d(X_i, P)^2)$$

This least-square problem is easy to solve, since the problem corresponds to finding the hyperplane fitting best a set of points. The solution is known, the hyperplane should pass through the centroid of points and the direction of the orthogonal vector can be easily obtained with principal component analysis.

In this example, the best solution corresponds to the plane of equation z=0, since all microphones are almost aligned on a plane (in this case, direction z is exactly the elevation or the direction of gravity). This is straightforward to figure out, imagine for instance that all microphones are placed on the soccer field.

To provide for a more efficient solution, in another embodiment, the solution can be obtained by retaining an eigenvector associated to the second smallest eigenvalue of an autocorrelation matrix (the smallest eigenvalue if associated to the direction). Mathematically, that means that the unit vector orthogonal to the plane to estimate is the following:

$$\begin{pmatrix} a \\ b \\ 0 \end{pmatrix}.$$

Figure 3:
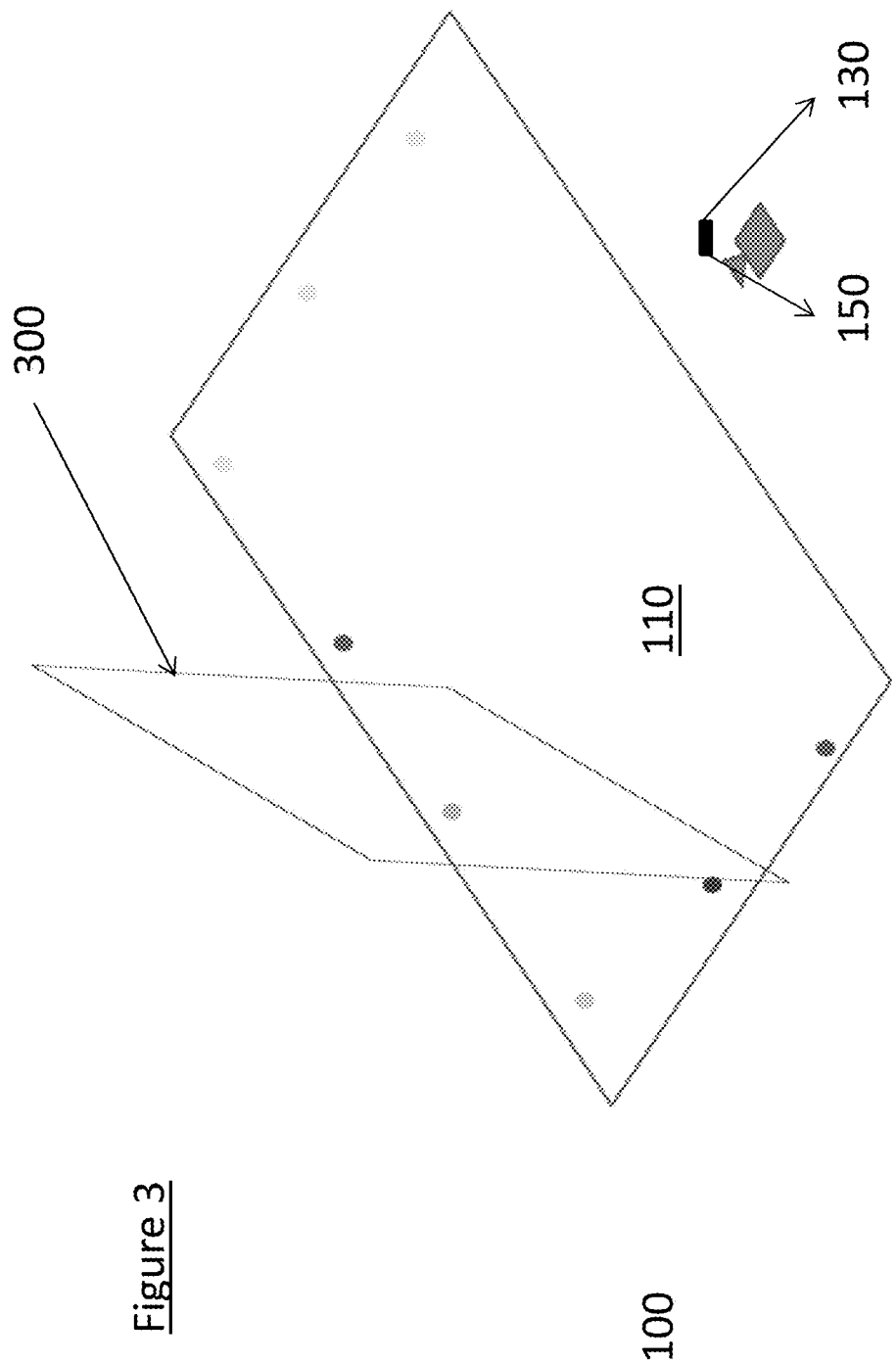
FIG. 3 is a block diagram showing a refocusing plane as estimated as per one embodiment.

With such a constraint, the optimal plane can be estimated though a least-square solver. FIG. 3 illustrates the result of this refocusing plane estimation, as per another embodiment.

In the example of the embodiment provided in FIG. 3, the placement and availability of the microphones are taken into consideration. In this example, the refocusing plane 300 is then estimated. The solution minimizes the mean square distance. For example, in one embodiment, one variant could be that the refocusing viewpoint can be chosen simply by the location around the microphone with highest interest score, this is applicable when e.g. $S_i(t) 141\ S_j(t)$, $\forall j \neq i$ In another embodiment, a different variant may be the optimal position of refocusing plane is determined from a subset of microphone position with relatively high interest score (e.g. $S_i(t)$>threshold):

$$\hat{P}(t) = \underset{P}{\operatorname{argmin}}\left(\sum_{i \in I} S_i(t) \cdot d(X_i, P)^2\right)$$

In order to provide the user or viewer an immersive experience, the plane that will be used to actually refocus the plenoptic acquisition will be temporally filtered in order to avoid jitter that would be visually uncomfortable. To do so, any temporal filtering on the data can be used such as Kalmann filtering for instance, or an heuristic update rule.

FIG. 4 is a flow chart depiction of some methodology that uses this example. In this embodiment, the methodology can be further appreciated by looking at FIGS. 1-3. As shown at 410, the processor that is in communication with at least one plenoptic camera and a plurality of microphones in the venue, receives calibration scores associated with each microphone. In step 420, the processor also receives an interest score associated with each microphone. As shown in step 430, the processor then calculates a threshold audio range for each of the microphones based on the calibration score and the interest score. This is because as discussed before, the location of each microphone may determine how important of an audio signal it may record. For example, a microphone placed at a location where spectators sit may have a much higher threshold so that the noise does not trigger a broadcast refocus based on an ordinary level of audience cheering or regular discussion between the crowd. However, a microphone disposed by a referee table may be more sensitive and adjusted for a much lower threshold so that even a heated debate can trigger it. The processor delivers digital images and associate audio signals from a default spatial coordinate normally as shown at 400. However, the delivery and focus will be shifted from the default spatial coordinate to a new spatial coordinate when an audio range threshold has been exceeded as shown at 440-460. The new spatial coordinate is associated with location of the exceeded threshold microphone. As shown at 450-455, a priority order may exist if more than one classifier or event is detected which can lead to establishment of a focus plane as discussed before.

The almost instantaneous re-shifting as provided by one embodiment, can provide an immersive experience that allows for delivery of timely broadcasting events as they develop. Hence, the user and viewer can easily follow the best moments in a game, party, or become aware of security concerns and even interact with customers in a way that provide immediate results.

What is claimed is:

1. A plenoptic camera having an array of sensors for generating digital images, said images having associated audio signals, comprising:
    said array of sensors configured to capture digital images associated with a default spatial coordinate;
    said array of sensors configured to receive control input from a processor to change focus from said default spatial coordinate to a new spatial coordinate based on occurrence of a classifier including a preselected or priority detected event, at said new spatial coordinate, said classifier being selected among a plurality of classifiers occurring concurrently based on a selected order of classifiers on a priority list.

2. The system of claim 1, wherein at least one sensor is in communication with a processor.

3. The system of claim 2, wherein said event is associated with occurrence of at least one classifier as detected by said sensor.

4. The system of claim 3, wherein said audio signals are captured by a plurality of microphones.

5. The system of claim 2, wherein more than one classifier exists and the order of refocusing is based on a selected order of classifiers on a priority list.

6. The system of claim 5, wherein at least one classifier is an audio event.

7. The system of claim 6, wherein said audio event includes one of: laughs, claps, or sound of a ball.

8. The system of claim 6, wherein said audio event is any abnormally loud sound above a preselected decibel threshold.

9. The system of claim 1, wherein said event is associated with occurrence of at least one classifier as detected by said sensor.

10. The system of claim 1, wherein said audio signals are captured by a plurality of microphones.

11. A method of capturing an image using a plenoptic camera focused on a default spatial coordinate, comprising:
    receiving via a processor a plurality of digital images from said plenoptic camera;
    receiving via said processor a plurality of audio signals associated with said digital images;
    determining by said processor occurrence of a classifier including a preselected or priority detected event and changing focus from said default spatial coordinate to a new spatial coordinate associated with said occurrence of said event classifier, said classifier being selected among a plurality of classifiers occurring concurrently based on a selected order of classifiers on a priority list.

12. The method of claim 11, wherein said default spatial coordinate is associated with a venue and said audio signals are received from a plurality of microphones disposed in different locations in said venue further comprising:
    receiving by said processor a plurality of calibration scores from said plurality of microphones; determining by said processor an interest score associated with location of each of said microphones; calculating by said processor a threshold audio range for each of said microphones based on said calibration score and said interest score; said processor changing focus and delivery of digital images and associated audio signal from said default spatial coordinate to a new spatial coordinate when an audio range threshold has been exceeded.

13. The method of claim 12, wherein said new spatial coordinate is being associated with location of said microphone associated with said exceeded audio range threshold.

14. The method of claim 13, wherein if more than one threshold range is exceeded, said processor provide said new spatial coordinate based on the microphone associated with the highest interest score.

15. The method of claim 14, wherein said processor categorizes said microphones by interest scores.

16. The method of claim 15, wherein said processor category is ranged from highly rated to lowly rated.

17. The method of claim 16, wherein a refocusing plane is calculated by said processor for delivery of images when threshold audio range has been exceeded by more than one microphone.

18. The method of claim 17, wherein an optimal position of said refocusing plane is computed by said processor from a subset of microphone position with relatively high interest score.

19. The method of claim 18, wherein said refocusing plane can be optimized by said processor by computing a weighted regression value.

20. The method of claim 19, wherein said weighted regression value is estimated based on the value of minimized mean square roots of each microphone and their associated interest score.

* * * * *